United States Patent [19]

Goodman

[11] Patent Number: 4,643,787

[45] Date of Patent: Feb. 17, 1987

[54] METHOD OF MAKING AN EMBOSSED PANEL DOOR

[75] Inventor: William Goodman, Troy, Mich.

[73] Assignee: Versatube Corporation, Troy, Mich.

[21] Appl. No.: 729,929

[22] Filed: May 3, 1985

[51] Int. Cl.$^4$ ............................................. B32B 31/04
[52] U.S. Cl. .................................. 156/196; 156/213; 156/214; 156/219; 156/228; 156/245; 52/809
[58] Field of Search ............... 156/196, 213, 214, 219, 156/228, 245; 52/809

[56] References Cited

U.S. PATENT DOCUMENTS

| 671,519 | 4/1901 | Kasebier et al. | 156/245 |
| 4,265,067 | 5/1981 | Palmer | 52/809 |

FOREIGN PATENT DOCUMENTS

| 622028 | 6/1961 | Canada | 156/219 |
| 4042665 | 11/1974 | Japan | 156/219 |
| 8116126 | 7/1983 | Japan | 156/228 |

*Primary Examiner*—Caleb Weston
*Attorney, Agent, or Firm*—Krass & Young

[57] ABSTRACT

An embossed plastic panel door including a pair of plastic panel faces, preferably made of polyvinyl chloride, at least one of the plastic panel faces having a preselected design embossed thereon, and a relatively rigid polystyrene core having the same preselected design burned onto its facing surface. The embossed design is stretch embossed on each of the plastic panels and is burned into the core with a heated die. The core is then covered with heated adhesive and the plastic facing panels are placed on the opposing major surfaces of the core with the designs on the panels in alignment with the burned-in designs on the core and the panels and core are pressed together to form the completed door. A wooden perimeter frame may be placed around the core prior to securing the plastic panel faces thereon in order to provide a thermal brake and increase the structural definition.

6 Claims, 6 Drawing Figures

METHOD OF MAKING AN EMBOSSED PANEL DOOR

FIELD OF THE INVENTION

The present invention relates generally to doors, and more particularly to doors employing embossed plastic panels and improved methods for their construction.

BACKGROUND OF THE INVENTION

Entry doors having embossed designs are typically constructed of a pair of steel panel faces mounted upon a wood frame surrounding a core of insulative material, such as polyurethane. A series of designs are embossed in each of the steel door panels by conventional stamping means. The polyurethane core is typically injected into the door to form a complete bond between the interior surfaces of the steel panel and the wood stiles and rails which form the door frame, thereby creating a unitized, dimensionally stable door assembly. Doors constructed in this manner provide good thermal and acoustic insulation as well as aesthetically pleasing deep embossed panel designs. However, while the steel panels utilized in the construction of these doors may be efficiently stamped with relatively detailed, attractive designs, the finished products are relatively heavy and expensive to manufacture.

Plastic sheet has been substituted for steel panels in doors, particularly in flush inner doors which do not contain embossed designs. However, attempts at mass producing panels with deep embossed designs from plastic have produced less than desirable results as the plastic sheets are susceptible to fracture and other material failure during the stamping process.

Interior doors having embossed designs on their facing panels are typically constructed from pressed board panels. The embossed designs are formed in a wet mat of the pressed board material which is subsequently steamed and then dried to form a hardened outer panel. While this method of making interior embossed panel doors is less expensive than the entry doors described above, the process for making these doors is time consuming.

One object of the present invention is to provide a light, inexpensive interior door having good thermal and acoustic insulation and facing panels with deep embossed intricate designs.

Another object of the present invention is to provide an inexpensive and efficient method for manufacturing plastic paneled doors having deeply embossed designs thereon.

SUMMARY OF THE INVENTION

The present invention consists of a door employing a pair of panel faces formed of a thermoplastic material, a wood perimeter frame, and a relatively rigid insulating core. The plastic panel faces are capable of receiving detailed deep embossed designs similar to those currently employed on steel panel entry doors. The desired embossed designs are stamped into flat plastic sheets which have been inserted into a die press machine. The core is preferably fabricated from a relatively thicker polystyrene sheet which has a design identical to the design stamped into the plastic panel faces burned into the surface of the polystyrene with a heated die. Both surfaces of the polystyrene core and the wood stiles and rails forming the perimeter frame of the door are then sprayed with a hot adhesive. The plastic panel face is then placed atop the adhesive coated core and frame with the embossed pattern on the panel face properly aligned with the corresponding burned-in pattern on the core. The aligned layers are then pressed together to form the finished door panel.

The embossed plastic panel doors produced according to the method of the present invention incorporate the desirable insulative and aesthetic qualities of conventional embossed steel panel and pressed wood doors, yet are lightweight and less expensive to manufacture.

DETAILED DESCRIPTION OF THE PREFERRED EMBODIMENT

Figure 1:
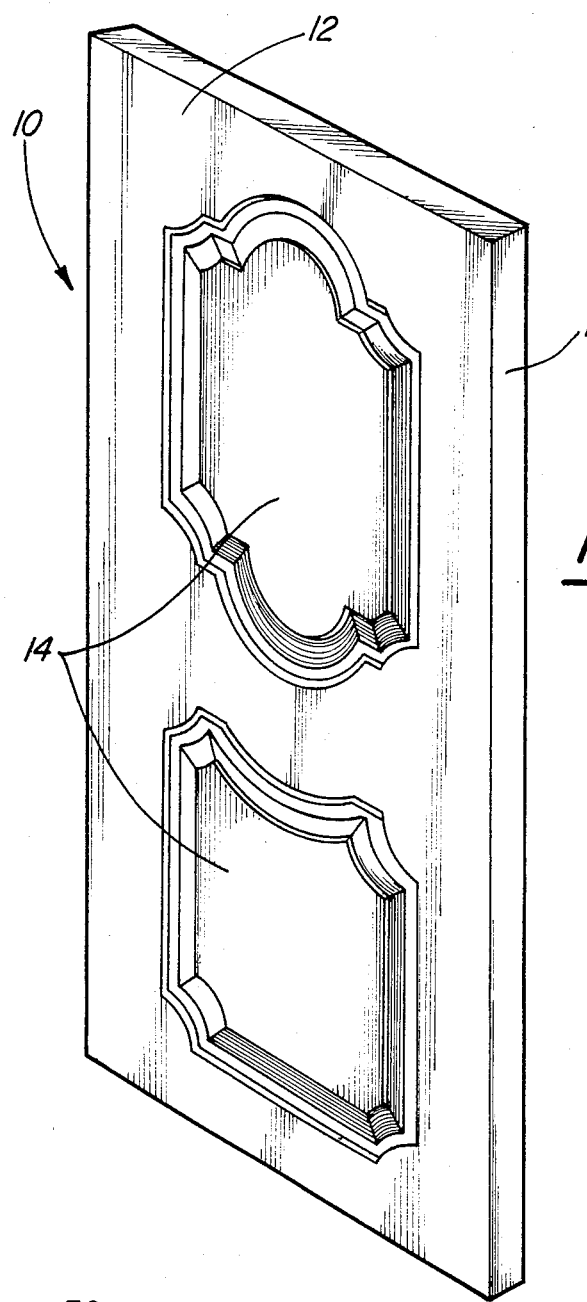
FIG. 1 is perspective view of a door manufactured by the method of the present invention, with a partial cross sectional view showing the components thereof.
Figure 2:
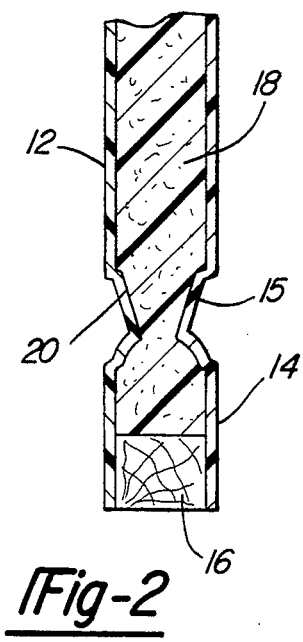
FIG. 2 is a partial cross sectional view of the embossed panel door of the present invention.

Referring to FIGS. 1 and 2, the embossed panel door 10 of the present invention includes a pair of plastic door panel faces 12 and 14 upon which preselected deeply embossed design panels 15 are located, a wooden perimeter frame 16 and a relatively rigid polystyrene core 18 having the identical embossed pattern imprinted thereon (at 20). Conventional door handle assemblies 22 and hinges (not shown) may be subsequently installed on the door 10 before the door 10 is installed for use. It should be noted that the plastic sheet material employed for the door panel faces 12 and 14 must be flexible enough to allow for stamping of the relatively intricate embossed panel designs 15 without fracturing the sheets during the stamping process, yet rigid enough to retain the fine lines of the designs without warping. The relatively rigid polystyrene core 18 provides adequate support for each of the door panel faces 12 and 14 in addition to providing the necessary thermal and acoustic insulative properties.

The polystyrene core 18 is surrounded by a wooden perimeter frame (shown as 50 in FIG. 3c) including a pair of stiles which are interlockingly joined to a pair of rails, one of which is shown as 16 in FIG. 2.

FIGS. 3a-3d illustrate the steps employed in the preferred process for making the embossed doors of the present invention.

Figure 3A:
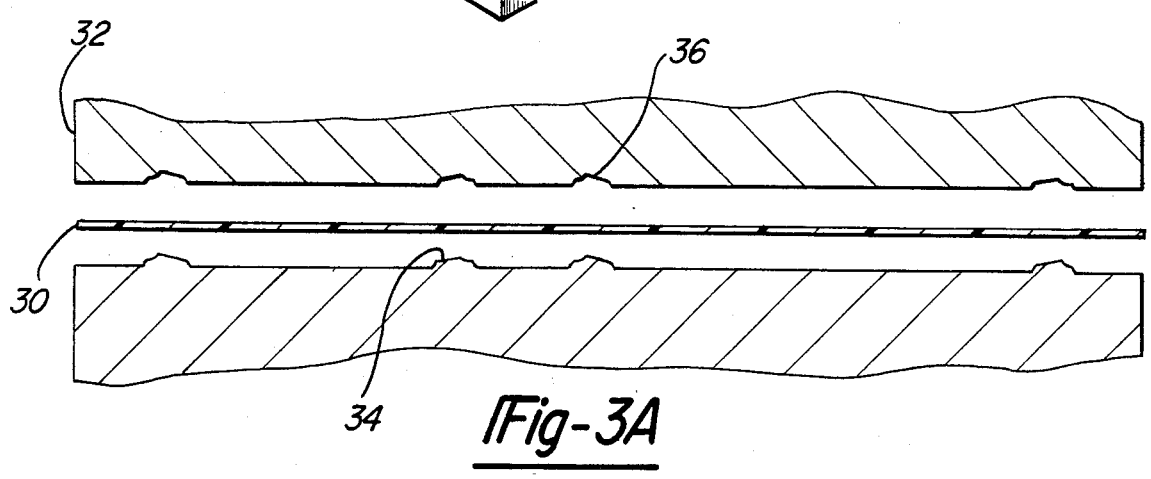
FIGS. 3a-3d illustrate the steps employed in manufacturing an embossed panel door of the present invention.

Referring to FIG. 3a, a generally planar sheet 30 is placed in a press 32 having a pair of matching dies 34-36 which combine during the pressing operation to form the embossment on the plastic sheet 30. According to the preferred method, a conventional 500 ton platen press, such as a Bliss 2000 single action double gear mechanical press, is utilized for stretch embossing the plastic sheets 30. The sheets are preferably heated to a temperature of from 100° to 125° F. prior to being placed in the press 32 for the embossing step. Up to 500 tons of pressure is applied to the sheet 30 for a dwell time of about two minutes. At this pressure and dwell time, the plastic sheet is "stretched" over the protruding portions of the mating dies 34-36 to form the desired design.

It should be noted that the type of material employed for the plastic sheet 30 is crucial to the success of this process because many plastics are highly susceptible to fracture when a stretch embossing step of the type described above is performed upon the sheet. A thermoplastic material, such as polyvinylchloride (PVC) is used. However, the PVC sheets 30 must contain enough plasticizers to ensure that the material will have a low enough glass transition temperature (Tg) so that it is formable when the materials exposed to the temperatures and pressures employed in the above-described embossing step. If the Tg is above the anticipated forming temperature, the material will be in a glass-like brittle state and will fracture as a result of the contact with the mating dies 34–36. Sufficient plasticizer is added to the PVC to lower the glass transition temperature to below 100°–125° F. in the preferred embodiment to ensure fracture-free embossing. In the preferred embodiment, a PVC sheet sold by the B.F. Goodrich Co. under the trademark "Vynaloy" is used for this purpose.

Figure 3B:
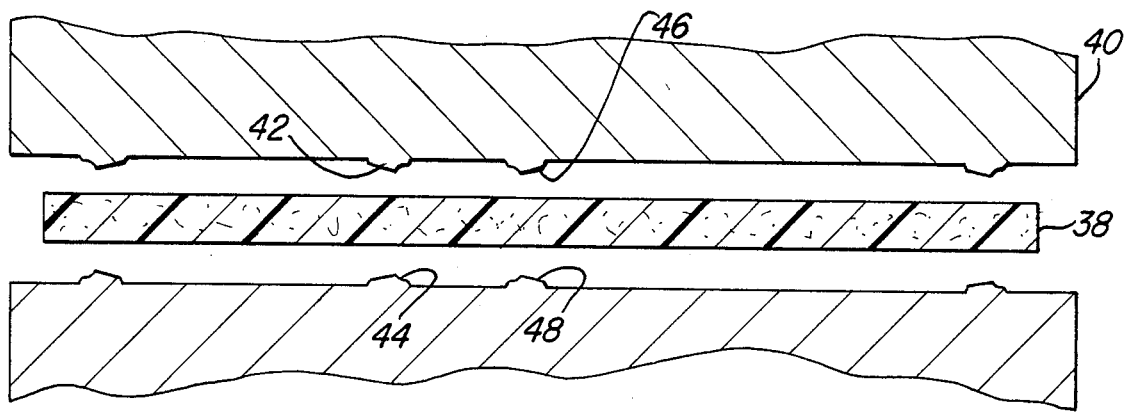

Referring now to FIG. 3b, a relatively rigid core 38, preferably made from polystyrene plastic, is placed in an air platen press 40 having one or more dies 42 corresponding to the embossed design which is being stamped onto the plastic sheet 30 in the first step. The die 42 is heated, preferably to a temperature in the range 280°–350° F., and is pressed onto the surface of the core 38 preferably at a pressure of about 30 P.S.I. for a period of about ten seconds in order to burn a design, nearly identical to the design being stretch embossed on the plastic sheet 30, onto the surface of the core 38. It should be noted that heated dies 42–44 may be placed on both the upper and lower faces 46–48 of the press so that the desired designs can be simultaneously burned into both of the opposing faces of the core 38. It should also be noted that this step of the process may be performed concurrently with the step defined above and shown in FIG. 3a.

Figure 3C:
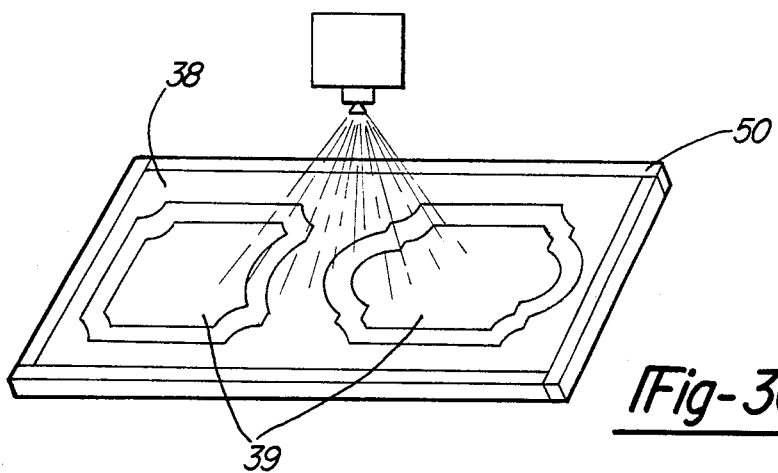

Referring now to FIG. 3c, the polystyrene core 38 is now placed within a frame 50. This frame is preferably made from wood and defines the finished outline of the door as well as providing a continuous thermal break. At this point, various optional internal components, such as lock blocks, may be installed within openings cut into the core 38 for that purpose.

The entire inner portion 52 of the door 10, comprising the polystyrene core 38 stamped with the suitable design 39 and the wooden frame 50, is then coated with a hot adhesive. The adhesive is preferably applied with a conventional heated spray gun, such as the gun manufactured by the Binks company. Fuller brand adhesive, heated to a temperature of approximately 160° F. is preferably employed for this purpose.

Figure 3D:
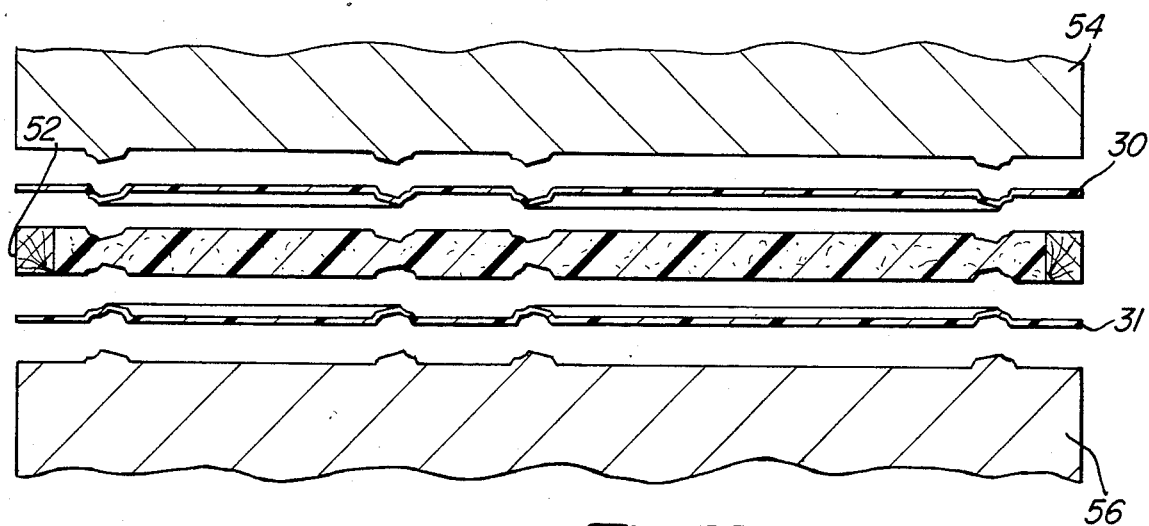

Referring now to FIG. 3d, the adhesive coated inner portion 52 is now placed in a third press 58. A plastic sheet 30, 31, prepared in the manner described in connection with FIG. 3a, is placed on one or both of the opposing major surfaces of the inner structure 52 with the stretch embossed pattern on the sheets 30, 31 in alignment with the corresponding pattern that has been burned into the surface of the core 38. The plastic sheets 30, 31 are then pressed onto the opposing surface of the inner structure 52 in a hydrauilc press, preferably for a period of about 90 seconds, to form the finished product. Again, it should be noted that, in this step of the process, the press may employ a pair of opposing dies 54–56 for simultaneously pressing each of the plastic sheets 30 and 31, forming the outer panels of the finished door over the adhesive coated inner structure 52. In the preferred embodiment, a 500-ton Williams and White hydraulic platen press is utilized. The platens are preferably heated in order to "flash" the water from the adhesive as the innerstructure 52 is sandwiched between the facing sheets 30 and 31.

At this point the conventional finishing touches, such as applying a spray painted coating to the edges of the door and/or installing desired door handles and conventional hinges, may be performed.

As will be appreciated by those skilled in the art, the above-described process is significantly less expensive and time consuming than the conventional methods for making pressed board interior doors with embossed designs. Also, the product of Applicant's process is considerably lighter in weight yet, comparable in its thermal and acoustic insulative properties.

What is claimed is:

1. A method for making an embossed door including the steps of:
   (A) providing a pair of relatively thin thermoplastic face sheets;
   (B) heating the pair of thermoplastic face sheets;
   (C) stretch embossing a preselected pattern on the heated thermoplastic face sheets in a platen press to form embossed door panel face sheets;
   (D) burning the same preselected pattern into both major faces of a relatively rigid and relatively thick polystyrene core sheet with a hot die;
   (E) mounting a wooden perimeter frame around the patterned core sheet;
   (F) applying hot adhesive to the patterned faces of the core sheet and to the adjacent faces of the perimeter frame;
   (G) aligning the embossed patterns on the plastic face sheets with the the corresponding burned patterns on the core sheet; and
   (H) pressing the embossed-plastic face sheets in place on the top respective opposite major faces of the core sheet.

2. The method of claim 1 wherein the thermoplastic face sheets are formed of a material having a relatively low glass transition temperature and the thermoplastic face sheets are heated to a temperature above their glass transition temperature.

3. The method of claim 2 wherein the thermoplastic face sheets are formed of a polyvinylchloride material having a glass transition temperature in the range of 100°–125° F.

4. The method of claim 1 wherein the die utilized in step D is heated to a temperature of between 280°–355° F., and the hot die is applied to the surfaces of the core sheet at a pressure of approximately 30 psi for a period of about 10 seconds in order to burn the preselected pattern into the faces of the core sheet.

5. The method of claim 1 wherein step G includes simultaneously pressing each of the plastic face sheets on the opposing major faces of the core sheet.

6. The method of claim 1 wherein the stretch embossing in step B includes heating the plastic face sheets to a temperature from 100°–125° F. and applying 500 tons of pressure to the sheets for two minutes.

* * * * *

UNITED STATES PATENT AND TRADEMARK OFFICE
CERTIFICATE OF CORRECTION

PATENT NO. : 4,643,787

DATED : February 17, 1987

INVENTOR(S) : William Goodman

It is certified that error appears in the above-identified patent and that said Letters Patent is hereby corrected as shown below:

Column 4, line 41 "on the top respective" should be --on the respective--.

Signed and Sealed this

Sixth Day of October, 1987

Attest:

DONALD J. QUIGG

Attesting Officer

Commissioner of Patents and Trademarks